United States Patent
Huang

(10) Patent No.: US 10,442,048 B2
(45) Date of Patent: Oct. 15, 2019

(54) TOOL HOLDER

(71) Applicant: Hsien-Jen Huang, Taichung (TW)

(72) Inventor: Hsien-Jen Huang, Taichung (TW)

( * ) Notice: Subject to any disclaimer, the term of this patent is extended or adjusted under 35 U.S.C. 154(b) by 0 days.

(21) Appl. No.: 16/018,031

(22) Filed: Jun. 25, 2018

(65) Prior Publication Data

US 2019/0001454 A1    Jan. 3, 2019

(30) Foreign Application Priority Data

Jun. 30, 2017   (TW) .............................. 106121910 A

(51) Int. Cl.
*B23B 27/10*   (2006.01)
*B23Q 11/10*   (2006.01)
*B23C 5/28*    (2006.01)

(52) U.S. Cl.
CPC .......... *B23Q 11/1023* (2013.01); *B23B 27/10* (2013.01); *B23C 5/28* (2013.01)

(58) Field of Classification Search
CPC ..... B23B 27/10; B23B 29/04; B23Q 11/1023; B23C 5/28
See application file for complete search history.

(56) References Cited

U.S. PATENT DOCUMENTS

2002/0122698 A1 * 9/2002 Lagerberg ............... B23B 27/10
407/11

FOREIGN PATENT DOCUMENTS

EP         0791420 A1 *  8/1997  ............. B23B 27/10
WO   WO-2017003342 A1 *  1/2017  ............. B23B 51/06

* cited by examiner

*Primary Examiner* — Alan Snyder
(74) *Attorney, Agent, or Firm* — Bruce Stone LLP; Joseph Bruce

(57) ABSTRACT

A tool holder includes a body, a base and a sprayer. The body includes an outlet portion and an end portion for mounting of a lathe tool. A first water channel hole and two diverted water channels are formed in the body, each diverted water channel has a first end connected to the first water channel hole, and the body has a second water channel hole with one end located on the end portion. The base has a connecting surface in contact with the bottom surface, and a water inlet connected to the first water channel hole, the connecting surface is provided with a groove connected to the water inlet and the second water channel hole. The sprayer includes two water spraying passages with one end located at the first end surface and connected to the diverted water channels, and another end located corresponding to the lathe tool.

4 Claims, 7 Drawing Sheets

TOOL HOLDER

BACKGROUND

Field of the Invention

The present invention relates to a lathe tool for cutting workpieces, and more particularly to a tool holder.

Related Prior Art

A conventional lathe tool 1 for machining purpose is shown in FIG. 1, and includes a tool holder 10 which is provided with a tool accommodating portion 11 and a water outlet portion 12. The tool accommodating portion 11 is provided with a cutting tool 13, which is used for cutting workpieces. The water outlet portion 12 is connected to an effluent member 20 which has a first end 201 connected to the water outlet portion 12, and a second end 202 facing the tool accommodating portion 11. The effluent member 20 is provided with a fluid channel 21, which runs through the first end 201 and the second end 202. A water passage 14, a first outlet 15, a second outlet 16 and an inlet 17 communicated with each other are formed inside the tool holder 10. The first outlet 15 is located at the tool accommodating portion 11, and the second outlet 16 is located at the water outlet portion 12 and connected to the fluid channel 21 from the first end 201.

In this way, when the lathe tool 1 is in use, cutting fluid is injected into the inlet 17, and flows out of the first and second outlets 15, 16, and finally the cutting fluid flowing from the first outlet 15 will flush and cool the cutting tool 13.

The cutting fluid flowing from the second outlet 16 flows into the fluid channel 21 via the first end 201, and finally flows out of the second end 202 to further cool the cutting tool 13.

However, the water passage 14, the first outlet 15, the second outlet 16 and the inlet 17 are disposed in the tool holder 10, so that, during the drilling of the water passage 14, the first outlet 15, the second outlet 16 and the inlet 17, it has to drill a hole in the surface of the tool holder 10, and then perform drilling inside the tool holder 10 to form the water passage 14, the first outlet 15, the second outlet 16 and the inlet 17. The drilling operation must be performed directly within the tool holder 10, resulting in that the lathe tool 1 is not easy to produce, and the production speed of the lathe tool 1 is further slowed to further increase the production cost.

The second outlet 16 and the fluid channel 21 are both single-tube pipes, so that the water pressure is dispersed, resulting in weaker water outputting force.

In view of this, it is necessary to provide an improved tool holder to solve the problem that the conventional tool holder is difficult to manufacture.

The present invention has arisen to mitigate and/or obviate the afore-described disadvantages.

SUMMARY

One objective of the present invention is to solve the problem that the conventional tool holder is difficult to manufacture, thus reducing the manufacturing cost.

To achieve the above objective, a tool holder provided by the invention comprises:

a body including a top surface and a bottom surface opposite to the top surface, the top surface including an end portion and an outlet portion, wherein the end portion is provided for mounting of a lathe tool, a first water channel hole is formed in the bottom surface of the body and two diverted water channels are in communication with the first water channel hole, each of the diverted water channels has a first end connected to the first water channel hole and a second end located on the top surface, the body is further provided with a second water channel hole which has two ends located on the bottom surface and the end portion, respectively;

a base including a connecting surface in contact with the bottom surface, and being provided with a water inlet which has one end located at the connecting surface, when the connecting surface comes into contact with the bottom surface, the water inlet is in communication with the first water channel hole, the connecting surface is provided with a groove which is in communication with the water inlet and the second water channel hole; and a sprayer including a first end surface attached to the outlet portion and a second end surface extending to the end portion, the sprayer further including two water spraying passages, wherein each of the water spraying passages has one end located at the first end surface and connected to the two diverted water channels, and another end located at the second end surface.

In this way, the groove only needs to be defined on the surface of the base, the water channels in communication with the second water channel hole can be formed. In comparison with the conventional lathe tool holder, where the water channels must be drilled within the lathe tool holder, the invention is easier to manufacture, thereby reducing the manufacturing cost.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

The present invention will be clearer from the following description when viewed together with the accompanying drawings, which show, for purpose of illustrations only, the preferred embodiment in accordance with the present invention.

Figure 1:
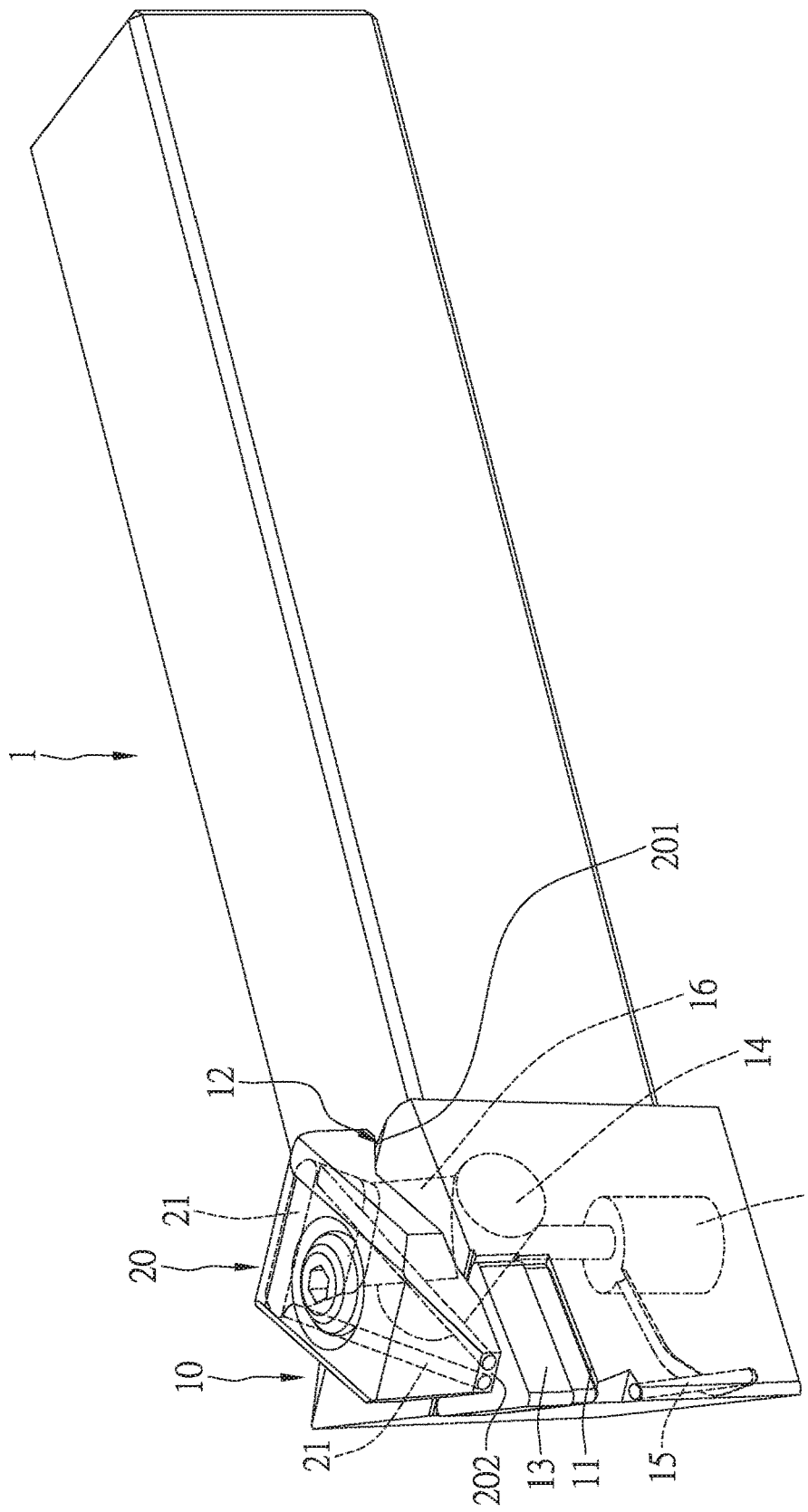
FIG. 1 is a perspective view of a conventional lathe tool holder.
Figure 2:
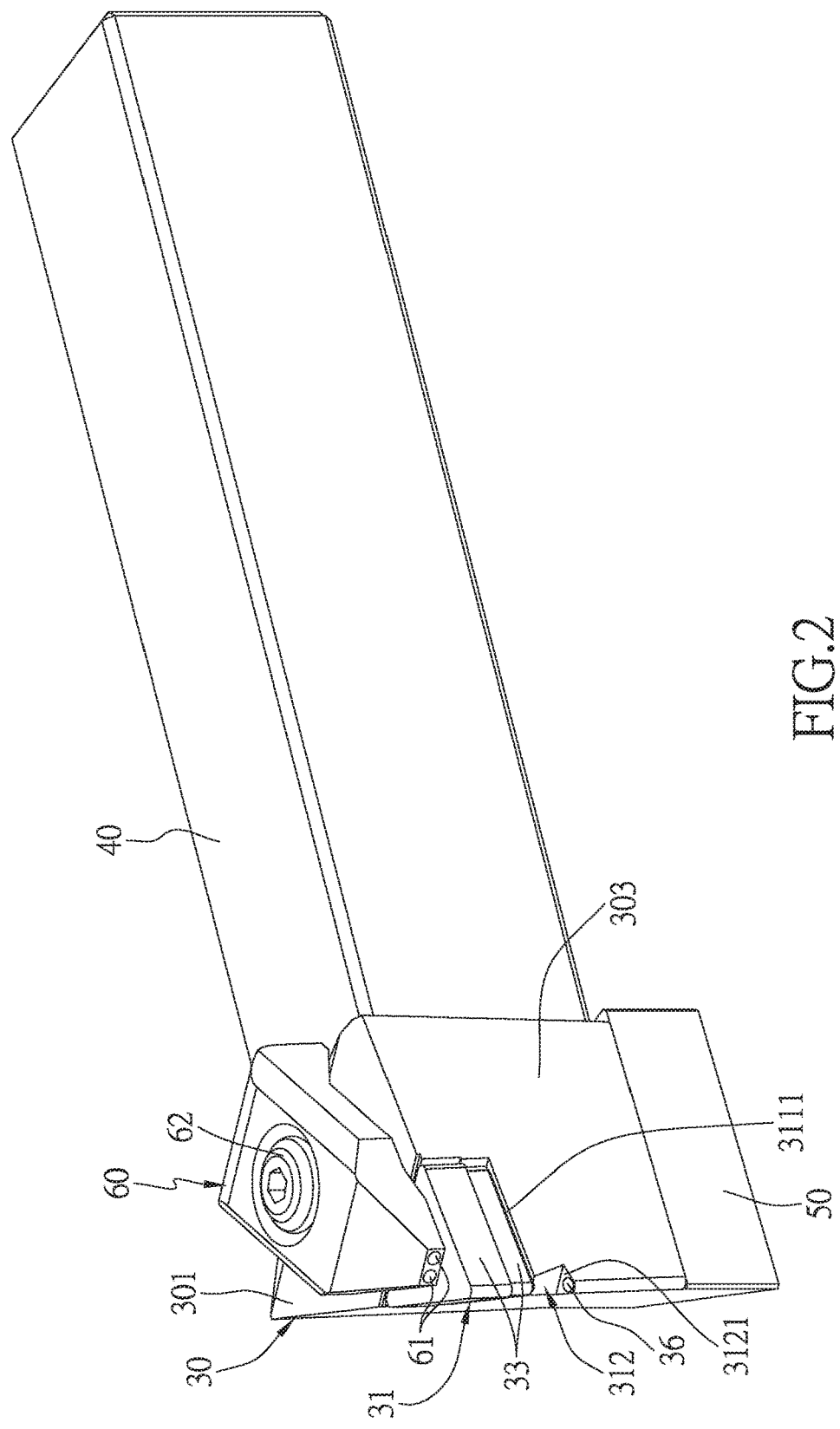
FIG. 2 is a perspective view of a tool holder in accordance with a preferred embodiment of the invention.
Figure 3:
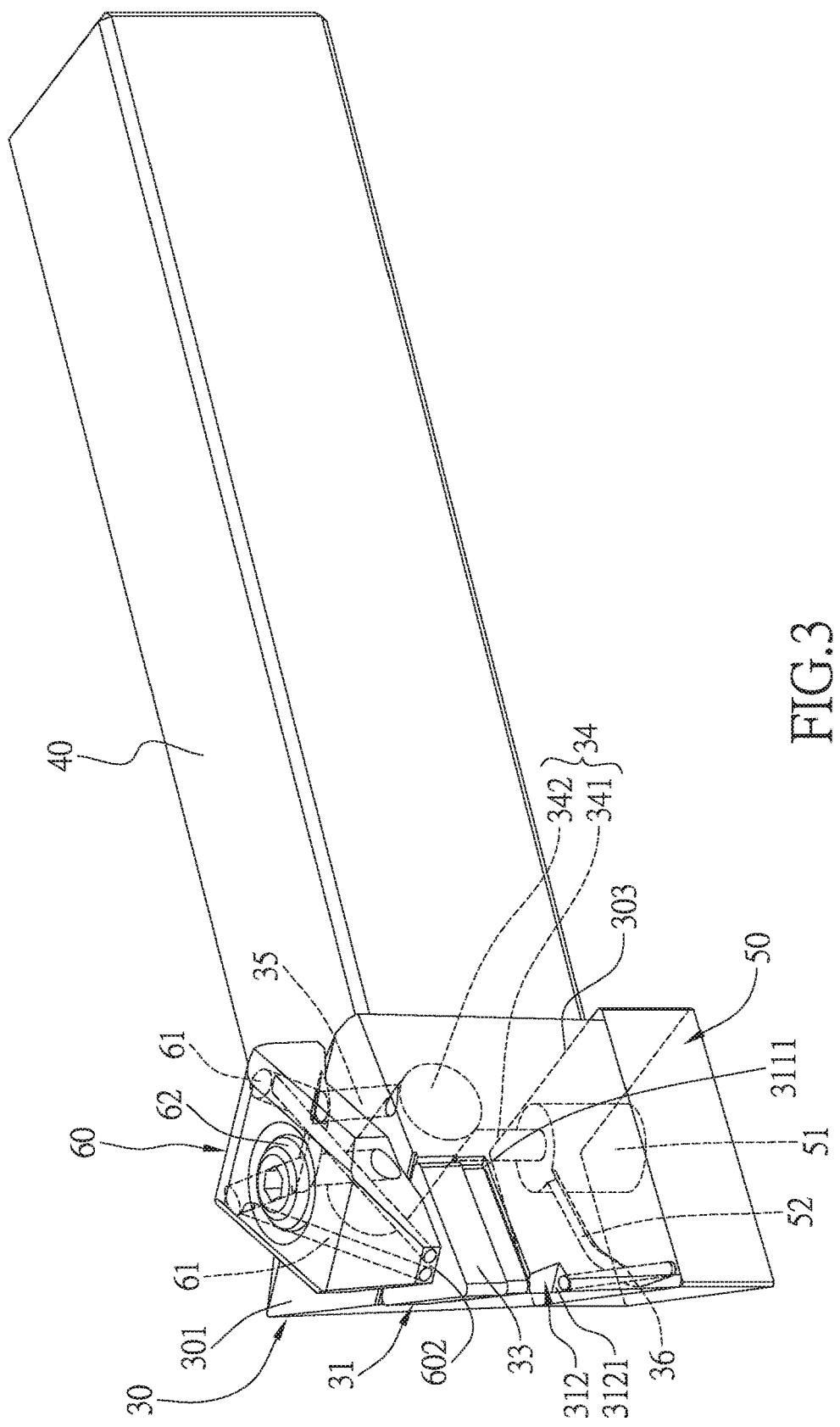
FIG. 3 is another perspective view of the tool holder in accordance with the preferred embodiment of the invention.
Figure 4:
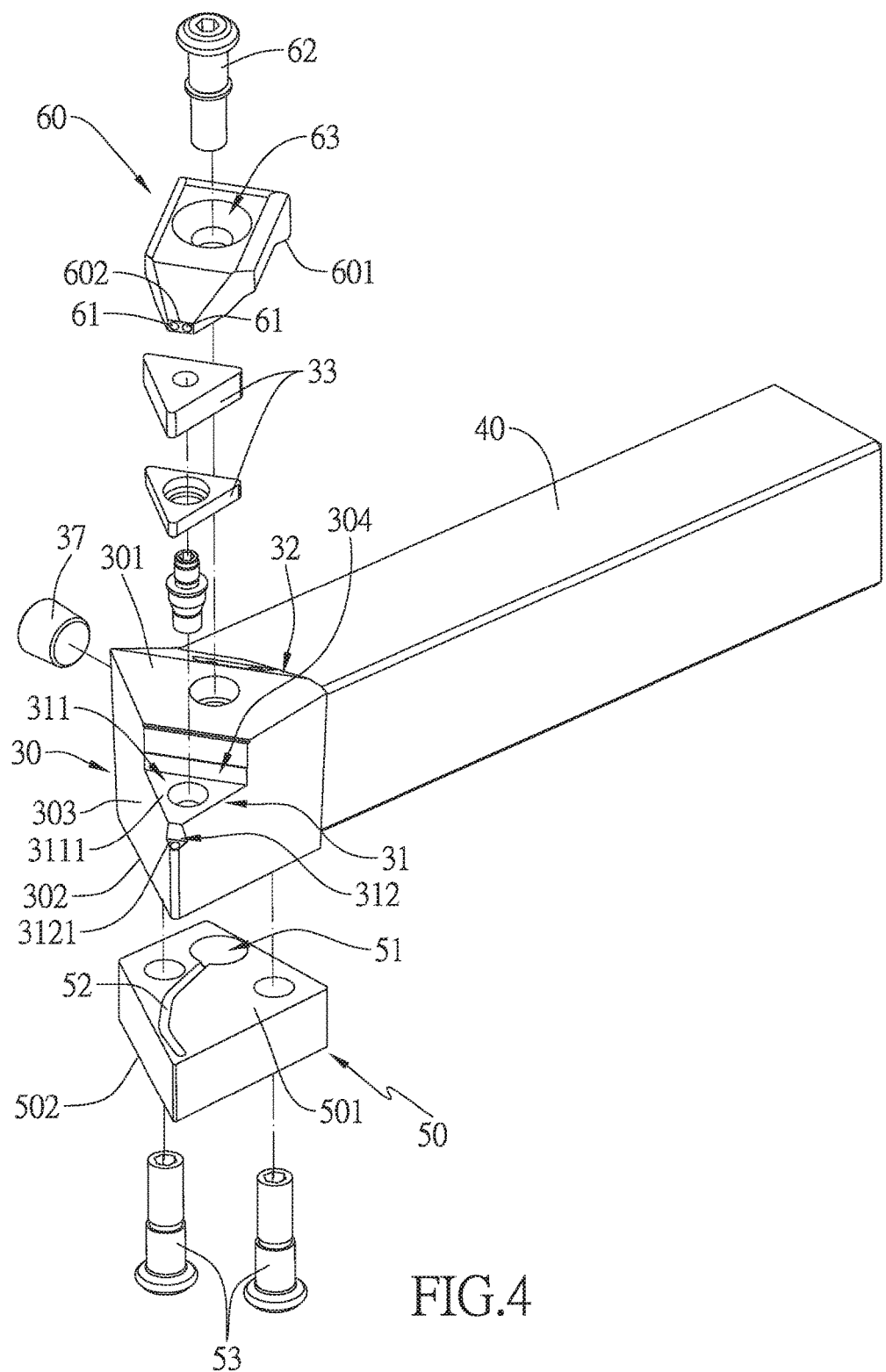
FIG. 4 is an exploded perspective view of the tool holder in accordance with the preferred embodiment of the invention.
Figure 5:
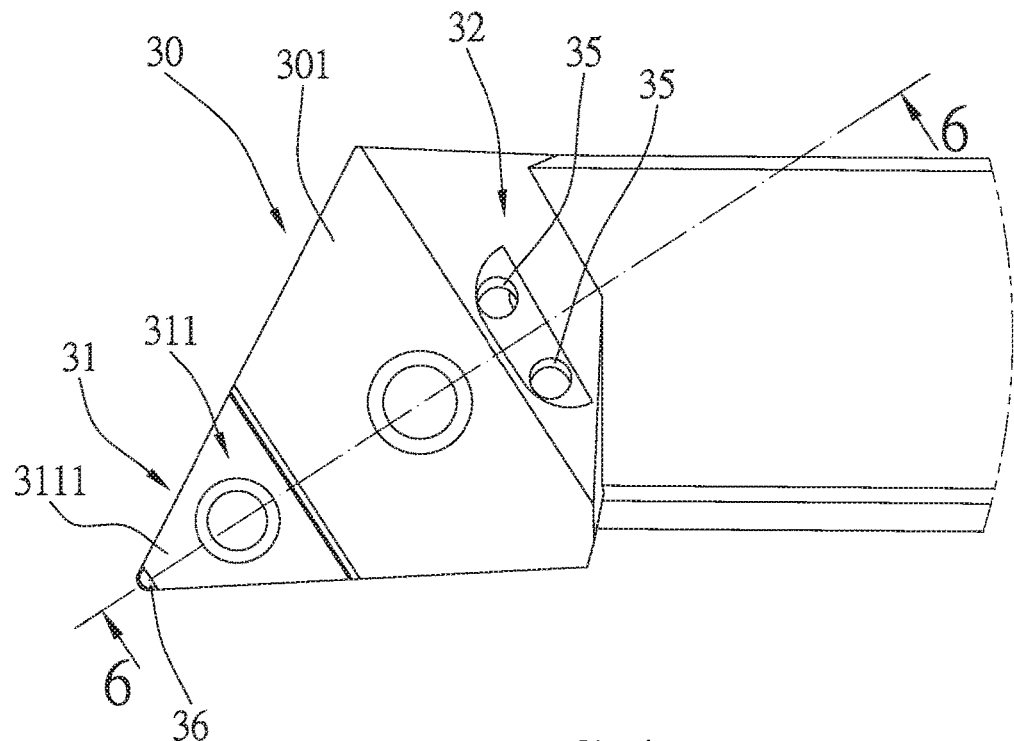
FIG. 5 is a top view of the tool holder in accordance with the preferred embodiment of the invention.
Figure 6:
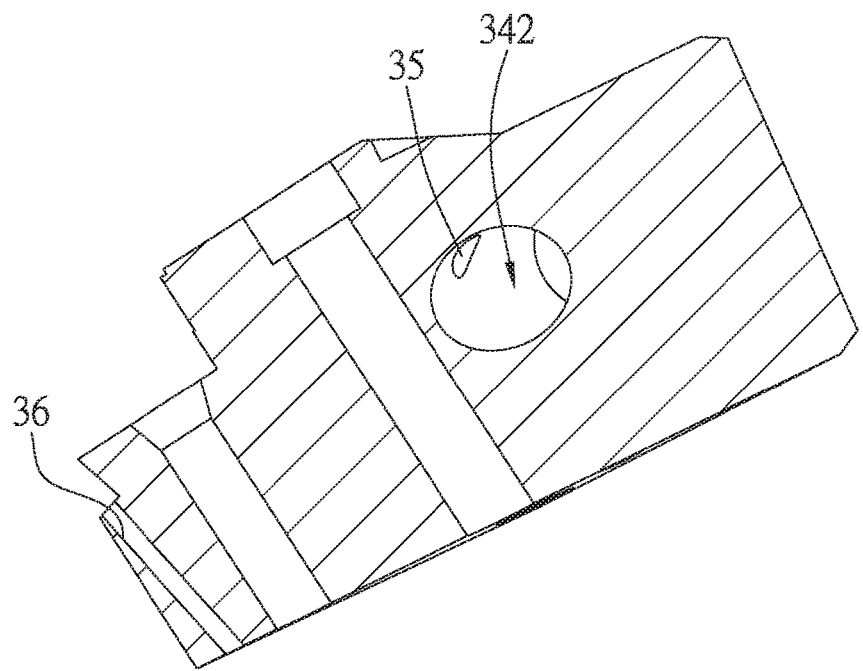
FIG. 6 is a cross sectional view taken along the line 5-5 of FIG. 5.
Figure 7:
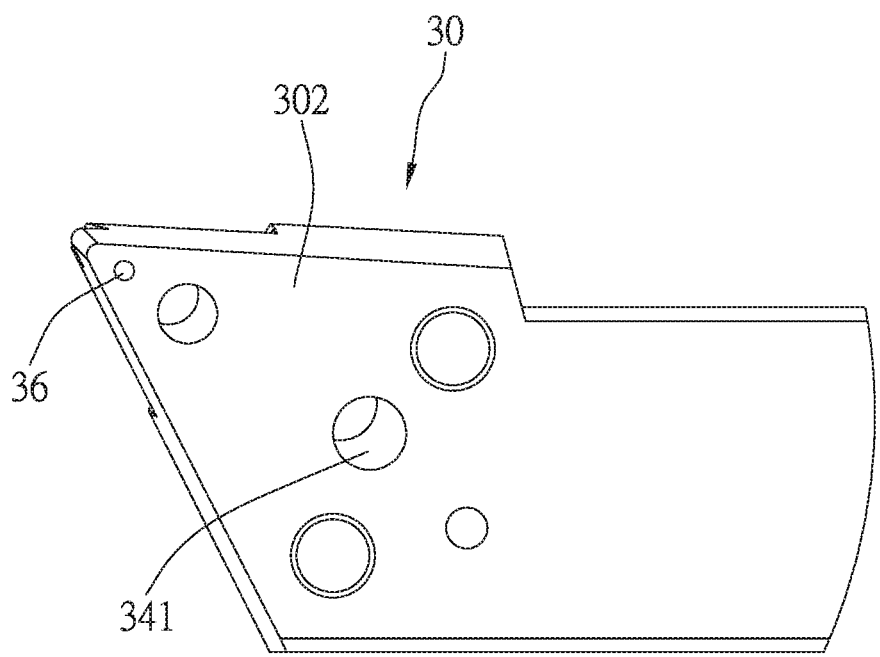
FIG. 7 is a bottom view of the tool holder in accordance with the preferred embodiment of the invention.
Figure 9:
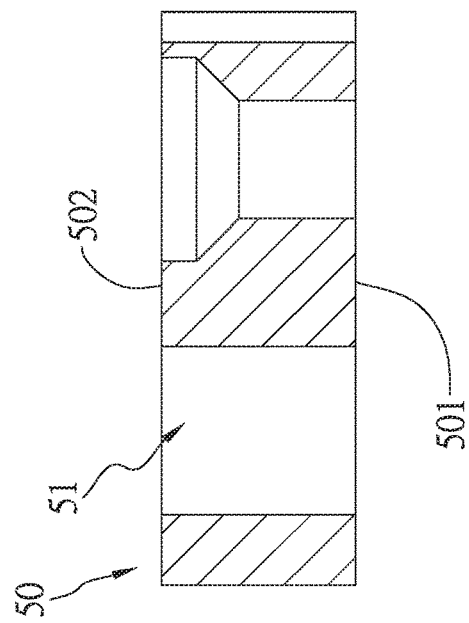
FIG. 9 is a cross sectional view taken along the line 8-8 of FIG. 8.
Figure 8:
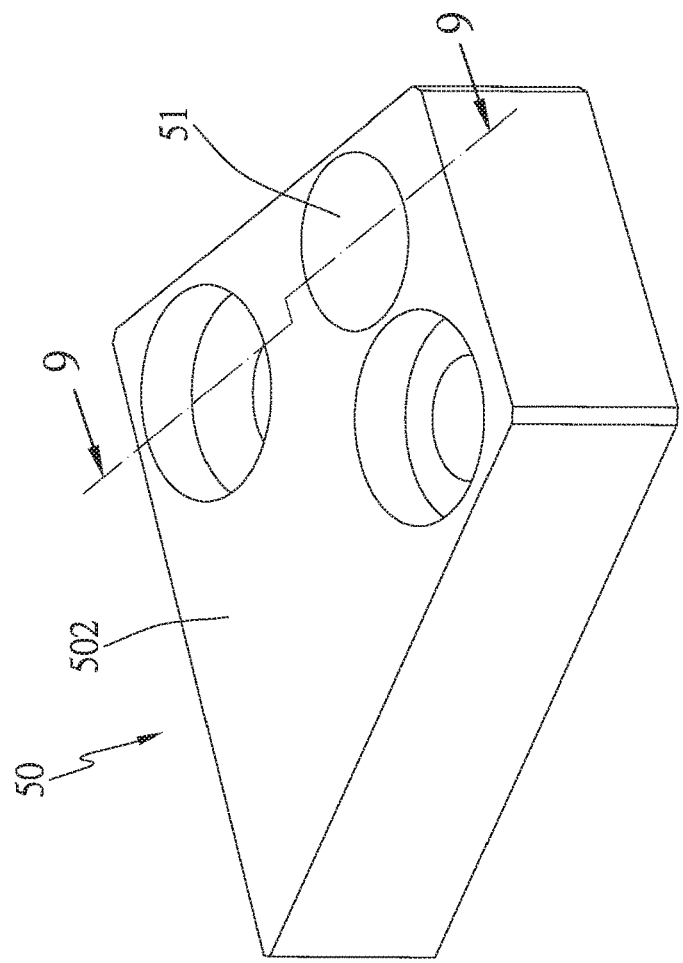
FIG. 8 is a perspective view of the base of the tool holder in accordance with the preferred embodiment of the invention.

Referring to FIGS. 2-9, a tool holder in accordance with the present invention comprises: a body 30, a base 50, and a sprayer 60.

The body 30 includes a top surface 301 and an opposite bottom surface 302. The top surface 301 is provided with an end portion 31 and an outlet portion 32. The end portion 31 is provided for mounting of a lathe tool 33. A first water channel hole 34 is formed in the bottom surface 302 of the body 30, and two diverted water channels 35 are in communication with the first water channel hole 34. Each of the diverted water channels 35 has a first end connected to the first water channel hole 34 and a second end located on the top surface 301. The body 30 is further provided with a second water channel hole 36 which has two ends located on the bottom surface 302 and the end portion 31, respectively.

In this embodiment, the body 30 is in the form of a triangular column, so that the body 30 has three lateral surfaces 303, one of the lateral surfaces 303 is connected to a handle 40, and another two of the lateral surfaces 303 intersect at an intersection point 304. The end portion 31 of the body 30 is located at the intersection point 304, and the outlet portion 32 is located on the lateral surface 303 connected to the handle 40.

The end portion 31 includes a lathe-tool recess 311 recessed from the top surface 301. The lathe-tool recess 311 has a lathe-tool-recess bottom surface 3111. The lathe-tool-recess bottom surface 3111 and the top surface 301 of the body 30 form a stepped structure. An outlet 312 is defined in the end portion 31, recessed from the lathe-tool-recess bottom surface 3111 towards the bottom surface 302, and includes a step surface 3121. The second water channel hole 36 has one end located at the step surface 3121 and has another end running through the bottom surface 302. When the lathe tool 33 is mounted at the end portion 31, the second water channel hole 36 can spray water towards the lathe tool 33.

The first water channel hole 34 includes a water conveying hole 341 and a transverse hole 342 which are in communication with each other. The water conveying hole 341 has one end located at the bottom surface 302 and another end connected to the transverse hole 342. The transverse hole 342 runs from one of the lateral surfaces 303 and is in communication with the water conveying hole 341 and the two diverted water channels 35. The opening of the transverse hole 342 at one of the lateral surfaces 303 is sealed with a plug 37.

The base 50 includes a connecting surface 501 in contact with the bottom surface 302, and is provided with a water inlet 51 which has one end located at the connecting surface 501. When the connecting surface 501 comes into contact with the bottom surface 302, the water inlet 51 is in communication with the first water channel hole 34. The connecting surface 501 is provided with a groove 52 which is in communication with the water inlet 51. When the connecting surface 501 comes into contact with the bottom surface 302, the groove 52 is in communication with the second water channel hole 36.

In this embodiment, the base 50 further includes an opposite surface 502 opposite to the connecting surface 501, and is provided with two first fixing bolts 53 which penetrate the base 50 from the opposite surface 502 to fix the base 50 to the body 30.

The sprayer 60 includes a first end surface 601 attached to the outlet portion 32 and a second end surface 602 extending to the end portion 31. The sprayer 60 is further provided with two water spraying passages 61, and each of the water spraying passages 61 has one end located at the first end surface 601 and connected to the two diverted water channels 35, and another end located at the second end surface 602.

In this embodiment, the sprayer 60 further includes a second fixing bolt 62 and a fixing hole 63 which runs through the sprayer 60, and the second fixing bolt 62 is inserted in the fixing hole 63 to fix the sprayer 60 to the outlet portion 32 of the body 30.

What mentioned above are the structural configurations of the present invention and their connection relations, and the use of the present invention is described as follows:

Referring to FIGS. 2-9, when the user inject cutting fluid into the water inlet 51, the cutting fluid will flow through the groove 52 into the second water channel hole 36, and the will be sprayed out of the second water channel hole 36 to cool the lathe tool 33.

The cutting fluid injected into the water inlet 51 will also flow through the water conveying hole 341, the transverse hole 342, the two diverted water channels 35 to the two water spraying passages 61 of the sprayer 60, and will then be sprayed out from the second end surface 602 of the sprayer 60 to cool the lathe tool 33. Since there are two such water spraying passages 61, which can prevent the pressure of the cutting fluid from being dispersed.

Accordingly, since the base 50 and the body 30 are respectively drilled with water channels or passages, the groove 52 only needs to be defined on the surface of the base 50, the water channels in communication with the second water channel hole 36 can be formed. In comparison with the conventional lathe tool holder, where the water channels must be drilled within the lathe tool holder, the invention is easier to manufacture, thereby reducing the manufacturing cost.

Moreover, since the two diverted water channels 35 is divided into two-tube water passages, and the two water spraying passages 61 correspond to the two diverted water channels 35, the water pressure is concentrated and the strength of the water discharge thereof is stronger.

While we have shown and described various embodiments in accordance with the present invention, it is clear to those skilled in the art that further embodiments may be made without departing from the scope of the present invention.

What is claimed is:
1. A tool holder, comprising:
a body including a top surface and a bottom surface opposite to the top surface, the top surface including an end portion and an outlet portion, wherein the end portion is provided for mounting of a lathe tool, a first water channel hole is formed in the bottom surface of the body, two diverted water channels are in communication with the first water channel hole, each of the diverted water channels has a first end connected to the first water channel hole and a second end located on the top surface, the body is further provided with a second water channel hole which has two ends located on the bottom surface and the end portion, respectively;
a base including a connecting surface in contact with the bottom surface, and being provided with a water inlet which has one end located at the connecting surface, when the connecting surface comes into contact with the bottom surface, the water inlet is in communication with the first water channel hole, the connecting surface is provided with a groove which is in communication with the water inlet and the second water channel hole; and a sprayer including a first end surface attached to the outlet portion and a second end surface extending to the end portion, the sprayer further including two water spraying passages, wherein each of the water spraying passages has one end located at the first end surface and connected to the two diverted water channels, and another end located at the second end surface.

2. The tool holder as claimed in claim 1, wherein the body has three lateral surfaces, one of the lateral surfaces is connected to a handle, another two of the lateral surfaces intersect at an intersection point, the end portion of the body is located at the intersection point, the outlet portion is located on the lateral surface connected to the handle, the end portion includes a lathe-tool recess recessed from the top surface, the lathe-tool recess has a lathe-tool-recess bottom surface, the lathe-tool-recess bottom surface and the top surface of the body form a stepped structure, an outlet is defined in the end portion, recessed from the lathe-tool-recess bottom surface towards the bottom surface, and includes a step surface, and the second water channel hole has one end located at the step surface and runs through the bottom surface.

3. The tool holder as claimed in claim 1, wherein the base further includes an opposite surface opposite to the connecting surface, and is provided with two first fixing bolts which penetrate the base from the opposite surface to fix the base to the body.

4. The tool holder as claimed in claim 1, wherein the sprayer further includes a fixing bolt and a fixing hole which runs through the sprayer, and the fixing bolt is inserted in the fixing hole to fix the sprayer to the outlet portion of the body.

* * * * *